United States Patent
Friend

(10) Patent No.: US 8,918,246 B2
(45) Date of Patent: Dec. 23, 2014

(54) AUGMENTED REALITY IMPLEMENT CONTROL

(71) Applicant: Caterpillar Inc., Peoria, IL (US)

(72) Inventor: Paul Friend, Morton, IL (US)

(73) Assignee: Caterpillar Inc., Peoria, IL (US)

(*) Notice: Subject to any disclaimer, the term of this patent is extended or adjusted under 35 U.S.C. 154(b) by 0 days.

(21) Appl. No.: 13/728,536

(22) Filed: Dec. 27, 2012

(65) Prior Publication Data

US 2014/0188333 A1 Jul. 3, 2014

(51) Int. Cl.
  *G06F 11/32* (2006.01)
  *G06T 1/00* (2006.01)
  *E02F 9/26* (2006.01)

(52) U.S. Cl.
  CPC . *E02F 9/264* (2013.01); *G06T 1/00* (2013.01); *E02F 9/267* (2013.01); *E02F 9/261* (2013.01)
  USPC .......................................... 701/34.4; 701/50

(58) Field of Classification Search
  CPC .................. G01C 11/06; G01C 15/00; G05B 2219/32014; H04N 13/044; H04N 13/0445; B60R 2021/0074; B60R 2021/0076; B60R 2021/2079; B60R 202/0081; G06T 17/10; G06T 17/20; G06T 7/00; G06T 11/00; G02B 27/017; G02B 27/0172
  USPC .................... 701/50, 36, 408, 432, 436, 34.4; 345/7–9, 632–634, 641; 359/13
  See application file for complete search history.

(56) References Cited

U.S. PATENT DOCUMENTS

| | | | |
|---|---|---|---|
| 5,815,411 A | 9/1998 | Ellenby et al. | |
| 6,094,625 A | 7/2000 | Ralston | |
| 7,209,221 B2* | 4/2007 | Breed et al. | 356/5.02 |
| 7,266,445 B1 | 9/2007 | Janky et al. | |
| 2003/0014212 A1 | 1/2003 | Ralston et al. | |
| 2006/0103590 A1* | 5/2006 | Divon | 345/7 |
| 2009/0177337 A1 | 7/2009 | Yuet et al. | |
| 2010/0289899 A1 | 11/2010 | Hendron et al. | |
| 2011/0187548 A1 | 8/2011 | Maynard et al. | |
| 2011/0311342 A1* | 12/2011 | Montgomery | 414/685 |
| 2013/0158778 A1* | 6/2013 | Tengler et al. | 701/31.5 |
| 2013/0278635 A1* | 10/2013 | Maggiore | 345/633 |

OTHER PUBLICATIONS

Denby, B. et al., "Augmented Reality for Mine Data Visualization," *APCOM 2002—Application of Computers and Operations Research in the Minerals Industry*, Jan. 1, 2002, abstract.

Bassan, J. et al., "The Augmented Mine Worker—Applications of Augmented Reality in Mining," *Proceeding Second International Future Mining Conference*, abstract 2011.

(Continued)

*Primary Examiner* — Yonel Beaulieu
(74) *Attorney, Agent, or Firm* — Leydig, Voit & Mayer

(57) ABSTRACT

The disclosed strategy and method assists in controlling a machine equipped with a work implement for performing work at a worksite. The work implement can be positioned around the worksite such that the implement is obstructed from view through an operator display device through which the worksite is visible. A controller or the like determines the position of the work implement and generates an augmented overlay. The augmented overlay is displayed on the operator display device superimposed over the worksite indicating the position of the work implement.

21 Claims, 7 Drawing Sheets

(56) References Cited

OTHER PUBLICATIONS

Kirchbach, Kim et al., "Optimized Work Flow Through VR and AR Technology on Construction Sites," *International Conference on Information Visualisation—IV*, pp. 549-551, 2011.

Zhang, Shou-Xiang, "Augmented Reality on Long-Wall Face for Unmanned Mining," *Journal of Computers*, vol. 6, No. 6, Jun. 2011, pp. 1213-1221.

* cited by examiner

AUGMENTED REALITY IMPLEMENT CONTROL

TECHNICAL FIELD

This patent disclosure relates generally to control systems and methods for machines equipped with work implements and, more particularly, to the use of augmented reality to facilitate control of the work implements.

BACKGROUND

Machines such as excavators, dozers, loaders, and the like may be used to perform various tasks in construction, mining and/or landscaping operations. The machines may be equipped with one or more work implements that can engage various objects to assist in performing the tasks. The work implements may be adjustable or manipulated in an intended manner by an operator, who may be onboard the machine or controlling the machine from a remote location. To assist the operator in controlling the machine and/or work implements, various control systems and technologies exist and have been incorporated into such machines. These systems and technologies can interact with various sensors and subsystems to provide information and data to the operator regarding the machine and/or work implements to further assist in control of the same.

For example, U.S. Patent Publication No. 2010/0289899 ("the '899 publication"), published on Nov. 18, 2010, describes a system for enhancing visibility of the worksite environment to an operator of a machine. According to the '899 publication, a work implement on a machine such as a loader may be moved into a position that partially or completely obstructs the vision of an operator during implement use. To overcome this problem, the '899 publication describes a system using a camera mounted at an unobstructed position on the machine relative to the operator. The camera captures an unobstructed image of the work environment that can be shown on a display located proximate to the operator. Thus, the operator can simultaneously view both the environment as obstructed by the implement and the unobstructed image on the display. In a sense, the operator can see through the implement. The present disclosure also functions to improve operator visualization but in a different manner.

SUMMARY

In an aspect, the disclosure describes a machine having a work implement for performing work at a worksite. The work implement may include a working edge or point. The machine can include an operator display device in which at least a portion of the work implement is visible. The machine can also include a controller configured to generate an augmentation overlay indicating the working edge or point of the implement and communicating the augmented overlay to the operator display device for display.

In another aspect, the disclosure describes a method of operating a work implement at a worksite. According to the method, the work implement is positioned in the worksite at a position in which a working edge or point of the work implement is obstructed from view through an operator display device. The method generates an augmentation overlay indicating the working edge or point and displays the augmentation overlay on an operator display device such that the overlay is superimposed on the worksite.

In a further aspect, the disclosure describes a controller-implement method for assisting control of a work implement. The method involves storing implement dimensional data regarding the geometric extension of a work implement into a controller. Further, a plurality of data inputs including implement position data are received into the controller. The controller generates an implement overlay from the implement dimensional data and the implement position data. The implement overlay is displayed on an operator display screen so as to be superimposed over the work implement.

DETAILED DESCRIPTION

This disclosure relates to machines equipped with work implements and a system and method for controlling those implements. The term "machine" as used herein may refer to any machine that performs some type of operation associated with an industry such as mining, construction, farming, transportation, or any other industry known in the art. For example, the machine may be an earth-moving machine, such as a wheel loader, excavator, dump truck, backhoe, motor grader, material handler or the like. Moreover, the work implement that may be connected to the machine may be utilized for a variety of tasks, including, for example, loading, compacting, lifting, brushing, and include, for example, buckets, compactors, forked lifting devices, brushes, grapples, cutters, shears, blades, breakers/hammers, augers, and others.

Figure 1:
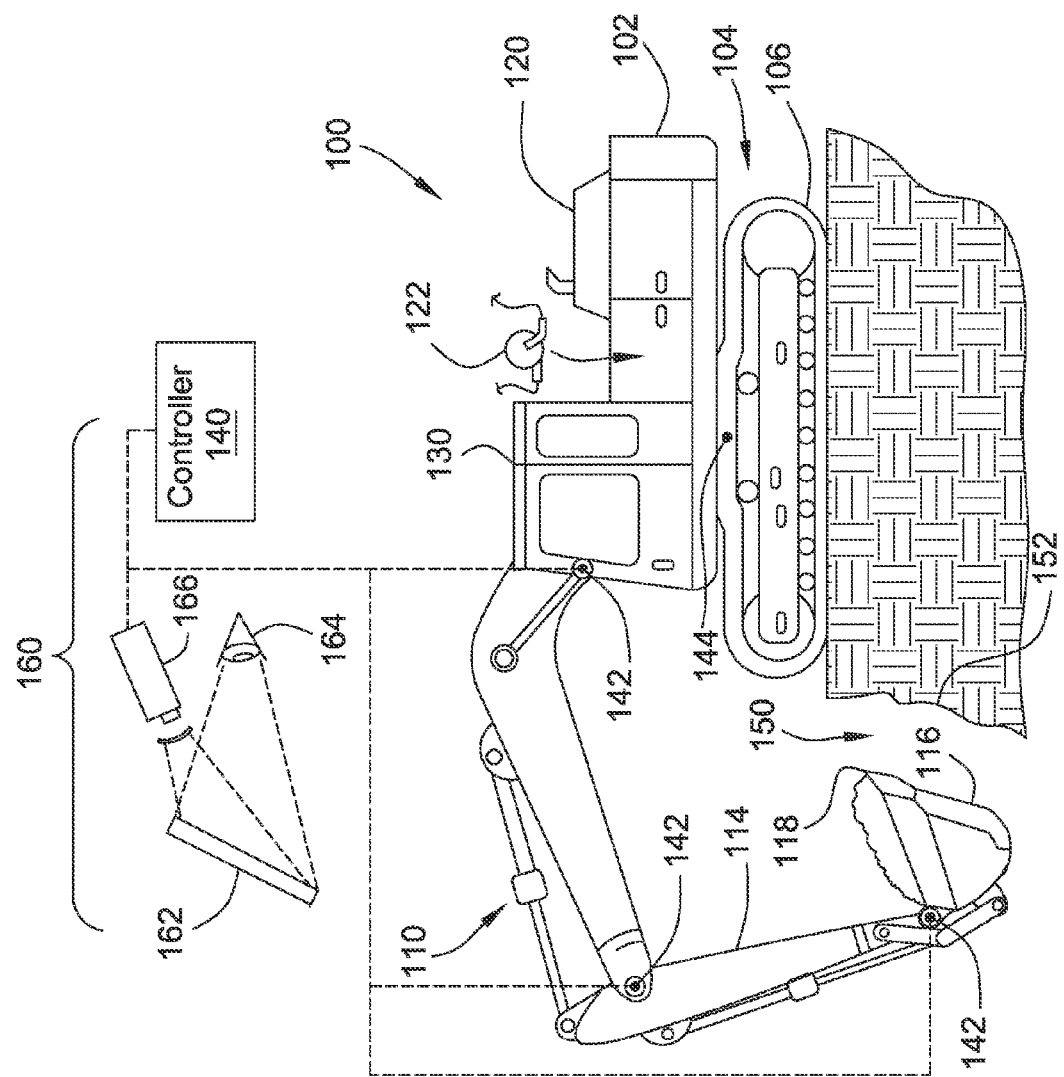
FIG. 1 is a side elevational, diagrammatic view of an embodiment of a machine, in particular, a hydraulic excavator having a controllably movable work implement in the form of an excavator crane and a schematic representation of an operator display device in the form of a heads-up display (HUD) adapted for augmented reality capabilities.

Referring to FIG. 1, there is illustrated an embodiment of a machine in the form of a hydraulic excavator 100. The excavator 100 includes a housing 102 that is disposed on top of and supported by an undercarriage 104. For mobility and propulsion, the undercarriage 104 may be associated with a pair of continuous tracks or caterpillar-type tracks 106, however, other embodiments can include rotatable wheels. Projecting from the housing 102 can be a work implement in the form of a hydraulically activated crane 110 that includes a powered boom 112, an articulating stick 114 and a bucket 116 disposed at the distal end of the stick. The bucket 116 may further include a working edge 118 or working point that engages the worksite to cleave or displace the material. The components of the crane 110 can be maneuvered to perform digging and excavating operations. To adjust the orientation of the crane 110 with respect to the worksite, the housing 102 is typically rotatable with respect to the undercarriage 104 by, for example, support bearings. To power operation of the excavator 100, a power source such as an internal combustion engine 120 and an operatively associated hydraulic unit 122 can be disposed on the housing 102.

To control operation and maneuvering of the excavator 100, various controls and gauges may be located in an operator's cab or operator station 130 disposed on the housing 102. These controls may enable driving and steering the excavator 100 about the worksite, rotating the housing 102 with respect to the undercarriage 104, and extending and moving the crane 110 and other work implements that may be equipped to the excavator. The operator station 130 can accommodate an operator who utilizes the controls and gauges to direct the excavator to perform the desired operations. To enable the operator to see the worksite or the environment in which the excavator is operating, the operator station 130 can include one or more clear or transparent windows.

To facilitate control and operation of the excavator 100, the excavator can be operatively associated with an onboard controller 140 such as an electronic control module. The controller 140 can include a microprocessor, an application specific integrated circuit (ASIC), or other appropriate circuitry and can have memory or other data storage capabilities. Although in FIG. 1, the controller 140 is illustrated as a single, discrete unit, in other embodiments, the controller and its functions may be distributed among a plurality of distinct and separate components. To direct the operation of the excavator 100 including activating and manipulating the crane 110, the controller 140 can be operatively associated with and can communicate with various actuators and system controls operatively disposed about the exactor. Additionally, the controller can receive information and data regarding the operating conditions of the excavator, including performance of the engine 120 and positioning of the crane 110 or other work implement, by communicating with various sensors and detectors that measure and output information about various physical quantities, states or conditions of the excavator. Communication between the controller, actuators, and sensors can be established by sending and receiving digital or analog signals across electronic communication lines, communications busses, radio frequency transmission and the like.

Among the functions performed by the controller 140 may be assisting in the operation of the crane 110 if, for some reason, the operator's view of the crane is obstructed. For example, referring to FIG. 1, the specific operation being preformed may require the operator to place the crane 110 or portions thereof into a hole, trench or pit 150 being dug by the excavator 100. This may involve positioning the bucket 116 and portions of the stick 114 in a location that is not readily visible from the operator station 130. In the specific embodiment, the depending walls 152 of the pit 150 may obstruct the view of the crane 110 or similar work implement during the exact time at which the working edge 118 of the bucket 116 engages the pit. Similar problems may occur if the bucket 116 is being submerged underwater or the excavator 100 is being operated at night or in a dark location.

Therefore, to determine the position of the crane 110 when the view thereof is obstructed, the controller 140 can communicate with various position or feedback sensors 142 disposed along the length of the crane. For example, the feedback sensors 142 can measure the relative degrees of articulation between the boom 112 and the housing 102, between the articulating stick 114 and the boom, and between the pivotable bucket 116 and the stick. If a portion of the crane 110 is extendable via a telescoping arrangement or the like, that function can be measured by the feedback sensors 142 as well. The feedback sensors can operator on any suitable principle and be of any suitable construction including electrical devices, mechanical devices, or electrical-mechanical devices. Furthermore, the quantities of interest may be measured directly, e.g., the degree of articulation of a work implement, or indirectly, e.g., extension of the hydraulic pistons and rods associated with the work implement and from which positioning information can be inferred. Other sensors can be positioned at other suitable locations about the excavator 100 to assess its position and orientation such as, for example, a feedback sensor 144 that senses rotation between the housing 102 and the undercarriage 104.

The feedback sensors 142, 144 can communicate data about the specific attributes they are intended to measure to the controller 140 that can process that data along with other information to determine the position of the crane 110 or other work implement. Specifically, the controller 140 can be pre-programmed with information regarding the dimensions regarding the physical, spatial extension and/or geometric volume of the crane 110 including length and possible range of articulation of the boom 112, articulating stick 114 and pivotable bucket 116. Using this information, it can be appreciated that the controller 140 can mathematically calculate or estimate the actual position including the three-dimensional extension or geometric volume of the work implement within the work environment even if the implement is wholly or partially obstructed from view.

To communicate the implement position to the operator once it has been determined, the controller 140 can be operatively associated with an operator display device that can utilize a technology sometimes referred to as "augmented reality" or "augmented vision" in which a person's perception or view of the real, physical world is augmented with additional informational input. That input may include additional information about the scene or focus currently viewed by the observer. An example of an operator display device 160 configured to augment the view observed by the operator of the excavator 100 is illustrated in FIG. 1. The particular operator display device 160 is sometimes referred to as a "heads-up display" because it enables operators to view augmentation data without having to move their head. The operator display device 160 includes a display screen 162 on which the augmentation content is shown. The display screen 162 can be disposed in the operator's line of view as indicated by the location of the operator's eyes 164. In the particular embodiment, the display screen 162 can be the windshield of the excavator 100 or other machine through which the operator views the worksite or surrounding environment. Accordingly, the display screen will be generally transparent but may be modified to also show augmented input as described below.

The augmentation content to be displayed may be maintained in the onboard controller 140 in a computer readable format, such as in electronic or magnetic storage. In different embodiments, the onboard controller 140 may generate the augmentation content itself or it may receive content generated elsewhere and transmitted to the excavator 100. To convert and transfer the augmentation data to a visible display on the display screen 162, a projector 166 disposed in the operator station 130 is oriented toward the display screen. The projector may be an optical projection system, a light emitting diode package, optical fibers or another suitable projector for transmitting an image. The display screen 162 can be configured to reflect the image from the projector 166, for example, by thin film coating, tinting, polarization or the like. The display screen 162 may also be a beam splitter, as will be familiar to those of skill in the art. Thus, while the display screen may be transparent to most wavelengths of visible light and electromagnetic radiation, it can reflect selected wavelengths such as monochromatic light back to the eyes 164. This type of display screen 162 may be referred to as an optical combiner because it combines two different images, the actual environment outside the operator station 130 and the image from the projector 166. The projected image may appear as an overlay superimposed on the view of the environment thereby augmenting the perceived environment observable by the operator.

Figure 2:
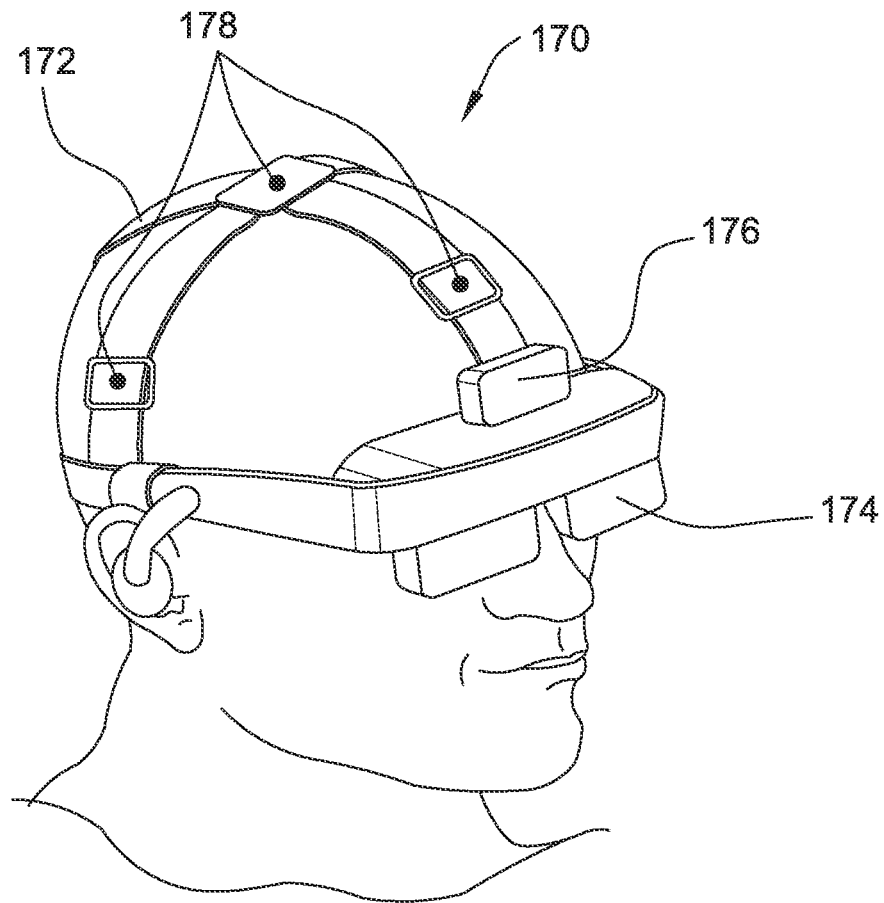
FIG. 2 is a diagrammatic perspective view of another embodiment of an operator display device in the form of a head mounted display (HMD) that may be worn by an operator and that is adapted for augmented reality capabilities.

The operator display device may take other suitable forms and augment the operator's perception by different methods. For example, referring to FIG. 2, there is illustrated an operator display device in the form of a head mounted display (HMD) system 170 configured for augmented reality capabilities. The HMD system 170 includes an adjustable strap or harness 172 that allows the HMD system to be worn about the head of a person such as an operator of the excavator or other machine. The HMD system 170 can include a visor or goggles with transparent lenses 174 that function as the display screens through which the wearer views the surrounding environment. The HMD system 170 can further include a scaled-down controller 176, that may include a processor or other electronics that can be in communication with a controller onboard the machine by, for example, wires or it can be otherwise networked into wireless, local area network (WLAN) by, for example, receiving and transmitting radio frequency signals. The controller 176 can process information transmitted to it and can project that information as augmented content onto the lenses 174, which can be optical combiners functioning as the display screen. Thus, the augmentation content can be projected in the person's field of view as an overlay superimposed on the surrounding environment.

In a possible further feature, the HMD system 170 can be configured to display augmented content not only specific to the location of the person wearing the device, but specific to the person's line of view. For example, a plurality of sensors 178 can be disposed about the harness 172 to determine the orientation of the head of the wearer. The sensors 178 can be of the same type or of a different type than feedback sensors 142, 144. For example, the sensors 178 may be Hall effect sensors that utilize the variable relative positions of a transducer and a magnetic field to deduce the direction, pitch, yaw and roll of an individual's head. The data obtained by these sensors 178 can be processed by the controller 176 so that the operator display device may know the orientation of the person's field of view. The augmented content generated by or transmitted through the HMD system 170 can be further particularized to the specific field of view, thereby increasing the sensitivity of the device.

Figure 3:
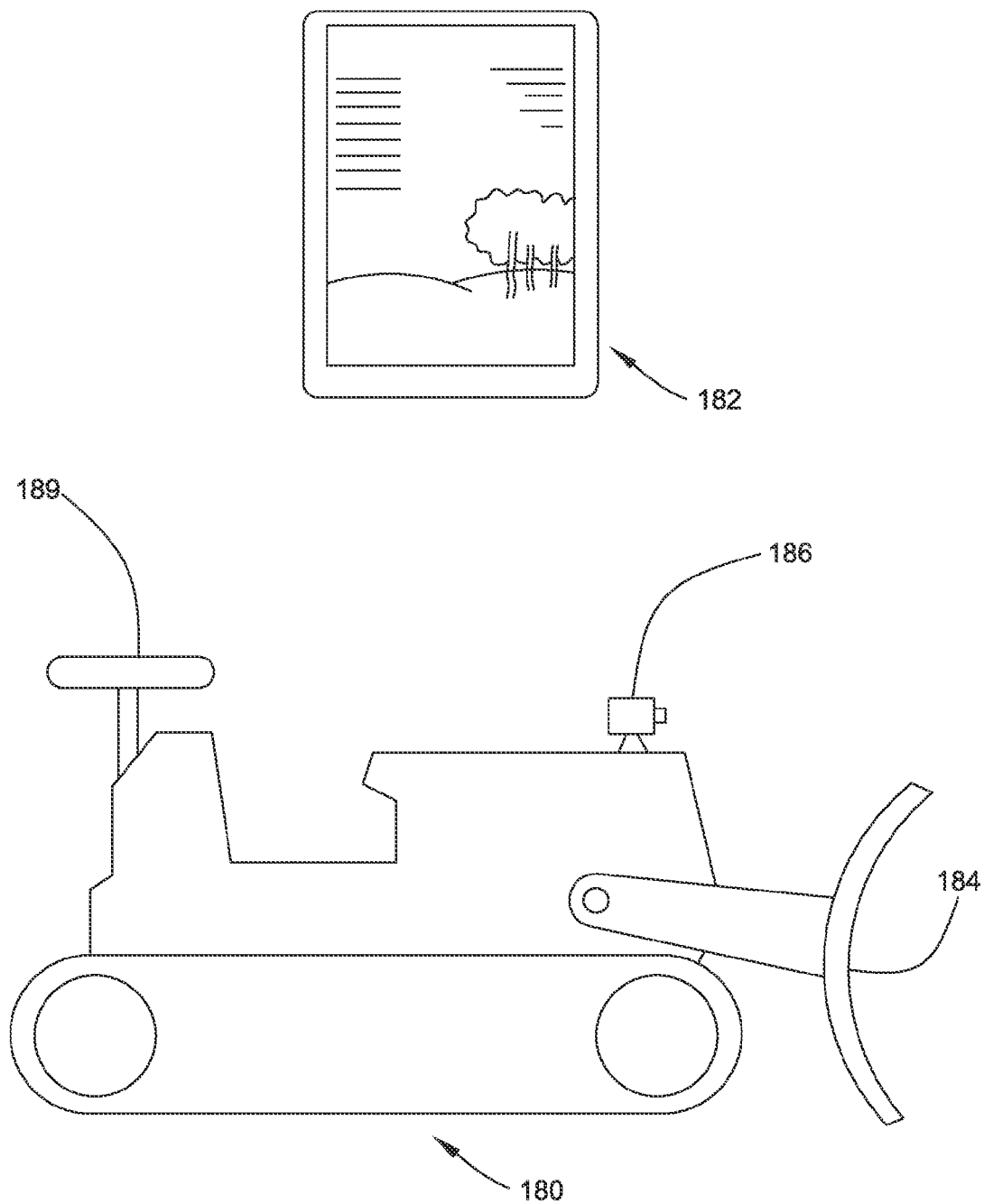
FIG. 3 is a diagrammatical side plan view of a bulldozer with a schematic representation of an operator display device adapted for remote control and augmented reality capabilities.

In other embodiments, the operator display device used to communicate the augmentation content to the operator may also project an indirect display of the physical environment in which the machine is operating. For example, referring to FIG. 3, there is an embodiment of the operator display device 182 that can be used to operator a machine such as a dozer 180 from a remote location, such as may be desirable if the machines are operating in a hazardous environment. The dozer 180 can also include a work implement in the form of a blade 184 that can be used to push terrain material about a worksite. To facilitate remote control, the dozer 180 may have a camera 186 mounted on it that records the immediate environment in which the dozer is operating and transmits the image, using the machine transmitter/receiver 188, to a remote location. The view captured by the camera 186 can be displayed on the operator display device 182, such as a liquid crystal display (LCD) or cathode ray tube (CRT), at the remote location from where the dozer 180 is controlled. The captured image thus assists the operator in directing the dozer 180 as if the operator were onboard the machine. However, the forward surface of the blade 184 may be visibly obscured from the image captured by the camera 186 and is reproduced on the operator display device 182. Accordingly, augmentation information associated with the captured image of the worksite including information about the position of the blade 184 can be superimposed on the operator display device 182 to augment the image and assist in operating the dozer 180. Thus, the operator can simultaneously view both the environment around the dozer 180 and the augmented input about the blade 184 and the worksite on the display 182.

Figure 4:
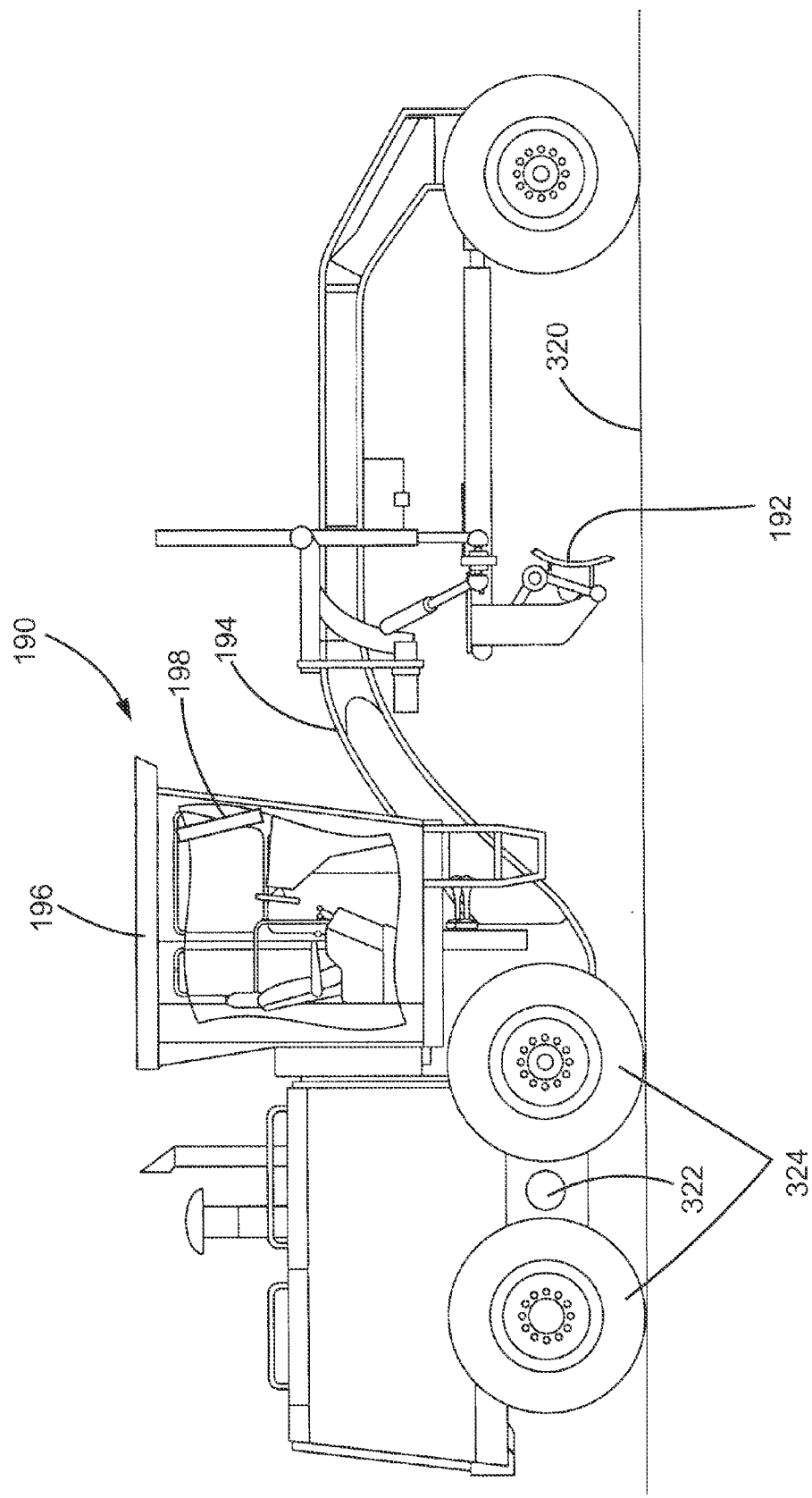
FIG. 4 is a side elevational, diagrammatic view of another embodiment of a machine, specifically, a motor grader having a controllably movable work implement in the form of a blade.

The machine that is associated with the operator display device displaying augmented content can also have different embodiments. For example, referring to FIG. 4, there is illustrated another embodiment of a machine in the form of a motor grader 190 used to flatten or smooth a worksite. The motor grader 190 may be capable of alternating between high speed, over-the-road travel and heavy load engaging operation. To engage the worksite, the motor grader 190 may include a work implement in the form of a blade 192 that is generally disposed underneath a frame 194 of the machine. The angle and/or orientation of the blade 192 may be adjustable to selectively plane the worksite on which the motor grader 190 is operating. To accommodate an operator, the motor grader 190 can also include an operator station 196 disposed on top of the frame 194 generally above and rearward of the blade 192 depending from the frame. Accordingly, it will be appreciated that it may be difficult for the operator to clearly see the blade 192 and the point of engagement between the blade and the worksite. Therefore, to improve the operator's view of the blade 192, the motor grader 190 may be equipped with an operator display device 198 in the operator station 196 that is operationally similar to the HUD capable of displaying augmentation content as described with respect to FIG. 1.

Figure 5:
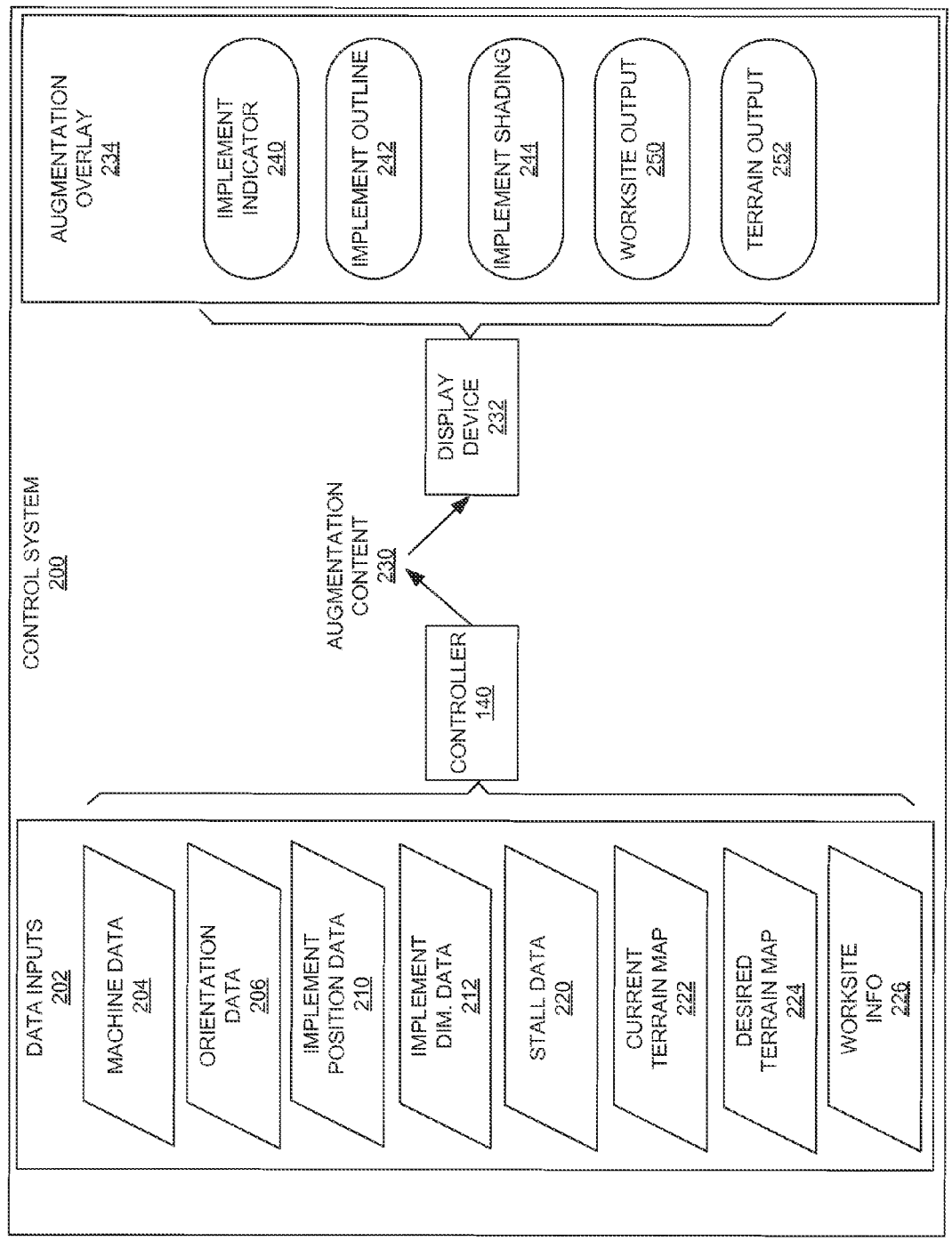
FIG. 5 is a block diagram illustrating the various inputs and outputs that may be communicated to and from a controller for generating an augmentation image or overlay to assist controlling a work implement.

Referring to FIG. 5, there is illustrated an example of a block diagram of a control system 200 that may be used to generate the augmentation content including information to assist in positioning or directing a work implement for display on any suitable display system. The control system 200 can be implement in part by a computer executable program that is performed by the controller 140 located onboard the machine, although in other embodiments the data processing routine may be performed by a off-board computer system and the generated augmentation content can be transmitted to the machine. To generate the augmentation content or information, the controller 140 can receive various data inputs 202 regarding the machine and the environment in which the machine is presently operating. Additionally, the data inputs 202 can be periodically or continuously updated so that the controller 140 is utilizing current information to generate the augmentation content. For example, the inputs can include machine data 204 about the operational or performance characteristics of the machine and its subsystems or its location with respect to the worksite and, in those embodiments utilizing a HMD, orientation data 206 as to the orientation of the operator's head to determine the operator's line of view. Information regarding the location of a machine can be obtained through a global navigation satellite system (GNSS) or global positioning satellite (GPS) system associated with the machine and orientation information can be obtained by the sensors equipped on the HMD described above.

To facilitate controlling the work implement, data inputs 202 can include implement position data 210 regarding the position or similar data about a work implement associated with the machine such as, for example, the crane or blade described above. Referring back to FIG. 2, the various feedback sensors 142 disposed along the crane 110 projecting from the excavator 100 can be used to obtain the implement position data 210. As discussed above, the controller 140 can be programmed with or can access implement dimensional data 212 regarding the three-dimensional size and/or shape of the work implement, e.g., the length, width and height of the crane 110. The implement dimensional data 212 can be stored as a coordinate system, for example, a Cartesian coordinate system, mapping or representing the three-dimensional extensions of the work implement in Euclidean space. The controller 140 can combine the implement position data 210 and the implement dimensional data 212 to determine the physical extension of the implement including its volumetric boundaries and its placement with respect to the machine and within the environment or terrain in which the implement is engaged.

The controller 140 may monitor and receive other types of data input 202 such as, for example, stall data 220 regarding slipping or stalling motion of the machine or the implement as described below. In an embodiment, other data inputs 202 can include and a current terrain map 222 of the present worksite and a desired terrain map 224 of how the finished worksite is intended to appear. Any other suitable type of information can be communicated to the controller as well including, for example, worksite information 226 about the actual or desired characteristics of the immediate worksite or terrain being operated on, e.g., the shape of a hole being formed, characteristic or quality of the materials, and the like.

The controller 140 generates the augmentation content 230 by extracting, processing and/or analyzing the various input data 202 and communicates the augmentation content for display on the operator display device 232. In an embodiment, the augmentation content 230 can be generated as an augmentation overlay 234 that can be superimposed over the view or image of the work environment presented through the operator display device. For example, one type of augmentation content 230 can be an implement indicator 240 that indicates on the operator display device 232 the location of the work implement with respect to the actual worksite. Specifically, the implement indicator 240 can be generated as a colored implement outline 242 such as a wireframe image or grid lines that trace or imitate the shape or profile of the actual work implement. In another embodiment, the implement indicator 240 can be colored shading 244 that highlights the work implement or pixilated dots representing the work implement. Accordingly, when the augmentation overlay 234 is superimposed over the view of the actual worksite on the operator display device 232, the implement outline 242 can be displayed at the location or position that corresponds to the actual work implement.

In addition to the implement indicator, the controller 140 can generate other augmentation content 230 for inclusion in the augmentation overlay 234. For example, if there is stored in or accessible to the controller 140 worksite information 226 about the worksite or terrain in which the work implement is operating, that information can also be presented as worksite output 250 on the operator display device. The augmentation overlay 234 can also include a map output 252 derived from the current terrain map 222 and the desired terrain map 224.

Figure 6:
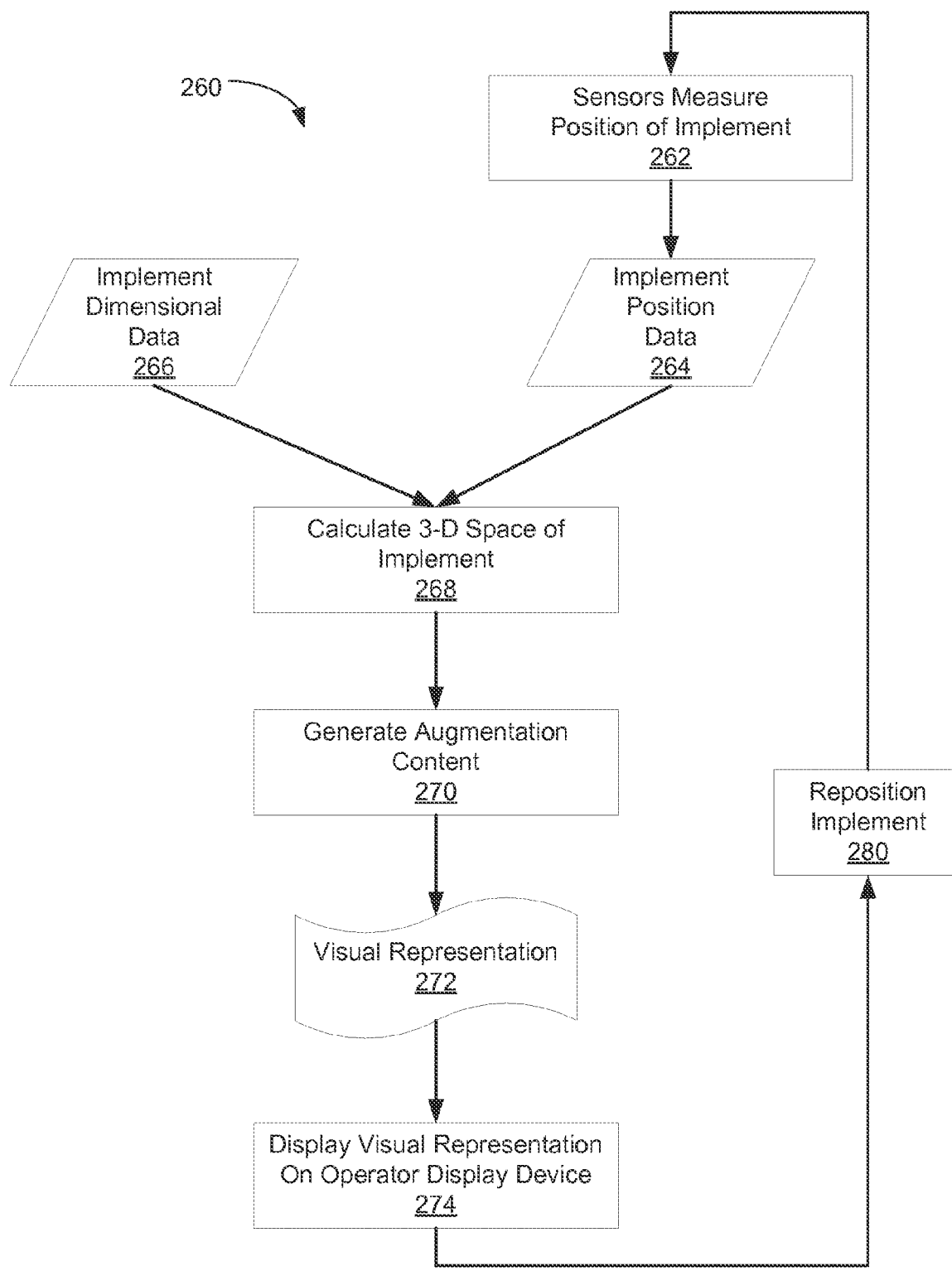
FIG. 6 is a flowchart representing possible steps or routines for generating an augmentation image or overlay to assist controlling a work implement.

Referring to FIG. 6, there is illustrated a computer executable routine 260 in the form of a flow chart that can be performed to generate augmentation contention for display to an operator. The routine 260 can be performed in addition to or instead of the control system 200 described in FIG. 5 and can be performed by an onboard controller or, in some embodiments, by an off-board computer system and the results can be transmitted to the operator display device. In a sensing step 262, the sensors disposed about machine determine the position of a movable work implement with respect to the rest of the machine. That information can be translated into implement position data 264 that is communicated to the controller for further processing. In addition to the implement position data 264, the controller may also receive implement dimensional data 266 that reflects the spatial dimensions of the work implement, for example, in Cartesian coordinates. In a calculating step 268, the implement position data 264 and the implement dimensional data 266 can be combined to determine the three-dimensional spatial volume of the work implement with respect to the machine. A result of the calculating step 268 is that both the position or orientation of the implement and its three-dimensional spatial extensions are known.

In a generation step 270, the results of the calculating step 268 and possibly other information can be used to generate an augmentation overlay. The augmentation overlay may include a visual representation 272 of the work implement in, for example, the form of a wireframe model or shading. The visual representation 272 can further correspond in spatial shape and size to the actual physical work implement when the representation is displayed on the display. The augmentation overlay including the visual representation 272 are communicated to the operator display device and displayed thereon in a display step 274 in such a manner that the visual representation can be superimposed over the operator's view of work implement. Hence, the visual representation 272 augments the operator's perception of the worksite so that the perceived position of the work implement is readily discernable even if the view of the actual work implement is obstructed.

In a further aspect, the operator may continue to move or reposition the work implement while performing the undertaken tasks at the worksite. In fact, the work implement may be continuously repositioned during operation. This can be represented by a repositioning step 280 in FIG. 6. Upon repositioning of the work implement, the sensors associated with the implement can sense or measure the new position and send the appropriate data to the controller, as indicated by the return arrow back to the sensing step 262. The controller can recalculate and regenerate the augmentation overlay so that visual representation repositions itself on the operator display device as the implement is moved about in the physical worksite. This process can be repeated continuously so that the superimposition of the visual representation over the worksite is updated and accurate.

INDUSTRIAL APPLICABILITY

Figure 7:
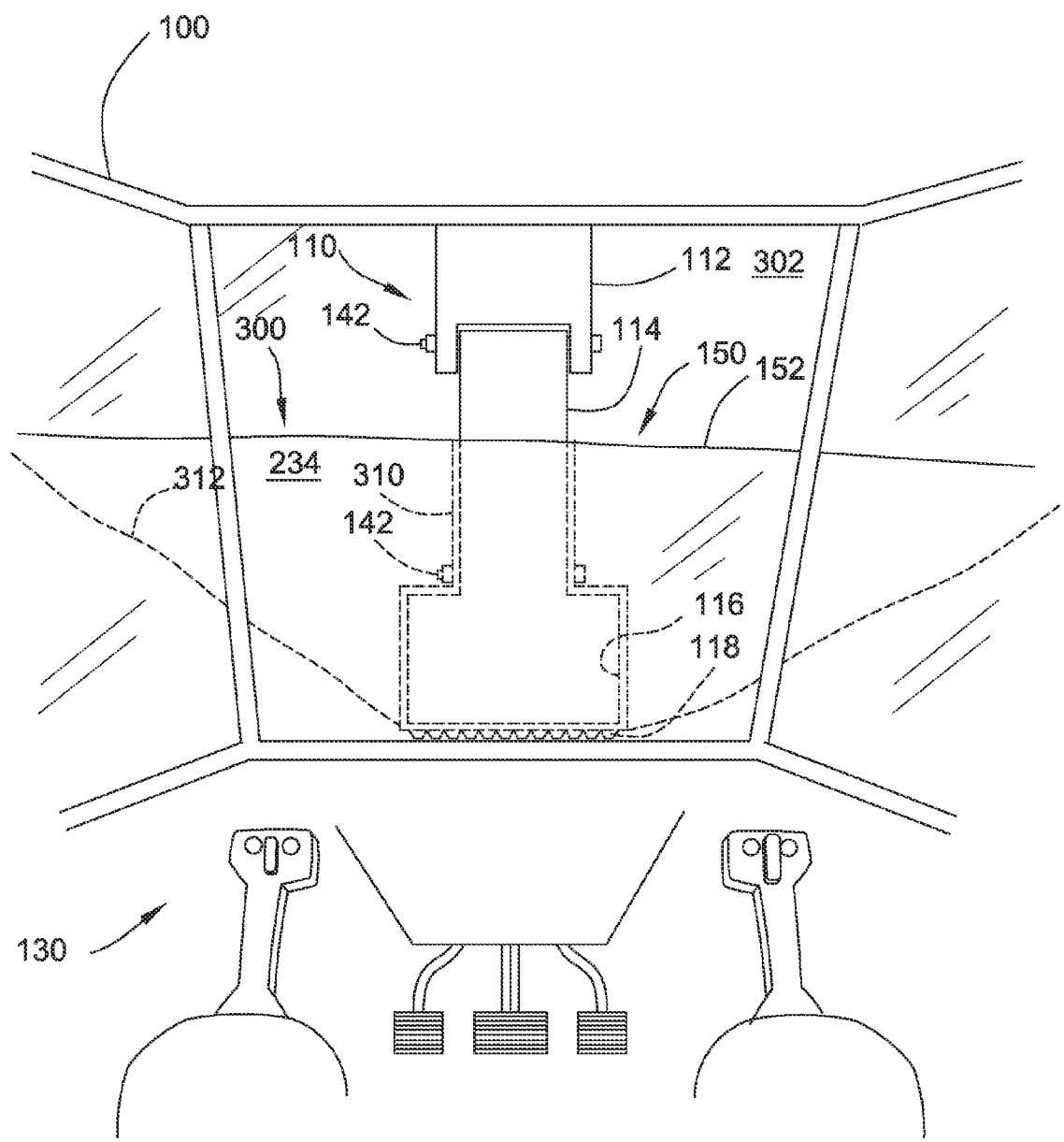
FIG. 7 is a diagrammatic view of a worksite from an operator station depicting an augmentation image overlaid on the view of the work environment.

The present disclosure applies augmented reality to assist control of a work implement that may be equipped to a machine. Referring to FIG. 7, there is illustrated the view of a worksite 300 as perceived through a windshield 302 of an operators station 130 on a machine such as an excavator 100. A portion of the work implement, and specifically the boom 112 of the crane 110, is visible in the line of view forward through the windshield 302. However, the operation or task being performed may require the operator to move another portion of the crane 110, specifically, the articulating stick 114 and the bucket 116, to a position in which they are out of sight through the windshield 302. For example, this may be behind the wall 152 of a pit 150 that the excavator 100 is digging. In other applications, a portion of the work implement may be submerged or concealed by other parts of the machine. Hence, the operator might not see the actual engagement between a working edge 118 or working point on the bucket 116 and the walls 152 of the pit 150 which may result in a misshapen excavation operation or in the bucket 116 or another part of the work implement unintentionally striking objects or fixtures present at the worksite.

Therefore, to enable the operator to perceive the position of the otherwise obstructed work implement, augmented content is generated as described above and presented in the operator's line of view as directed toward the worksite 300. To present the augmented data, the windshield 302 of the operator station 130 can be constructed as a generally transparent HUD that, as described above, is reflective of selected frequencies of light. Accordingly, when projected against the windshield 302, the augmentation overlay 234 is visible to the operator as indicated in FIG. 6. In various embodiments, the entire windshield 302 or only selected portions of the windshield can be made reflective to the augmentation content projected thereon. Instead of or in addition to the HUD, it should be noted that the disclosure contemplates using any other suitable type of optical combiner including HMD's and remote display screens to present the augmented content to the operator.

To accentuate the crane 110 or at least the hidden portions thereof, the augmentation content includes an implement indicator, for example, in the form of an implement overlay 310 (indicated in dashed lines for illustration purposes), that is superimposed over the location of the actual work implement. The implement overlay 310 may be in the form of solid colored gird lines or a wireframe image outlining the work implement or shading highlighting the implement. Alternatively, the implement overlay 310 may be a plurality of pixilated dots or points applied to the work implement to accentuate the physical implement. The implement overlay 310 can thereby indicate to the operator of the excavator the exact location of bucket 116 even if it is obstructed from view. In an embodiment, the implement overlay 310 may particularly emphasize the working edge 118 of the bucket 116 or a similar point or edge of a work implement that engages the pit 150 or a similar work environment. By emphasizing the working edge 118, the operator might visualize the cut or similar feature being made by the work implement. Further, if the crane 110 or another work implement is repositioned during use, the feedback sensors 142 disposed at select locations along the crane can sense the new position and direct appropriate signals back to the controller generating the augmentation content. In response, the controller can adjust the displayed location of the implement overlay 310 to reflect the repositioning of the crane 110.

The augmentation content displayed can include other information in addition to the implement overlay 310. For example, in an embodiment, the operator may be attempting to excavate to or through a target point 312, such as a specific ore deposit or a finished contour for the pit 150. In some instances, the target point 312 may reflect the difference between the present terrain or topography and the desired terrain and topography thereby indicating where material should be removed. The target point 312 may be included in the augmentation overlay 234 in any appropriate manner including solid lines, shading, graphics, text and the like. Other presentable information may include performance metrics regarding the machine, such as ground speed, engine temperature, etc.

Referring back to FIG. 4, there is illustrated further information that can be presented to the operator in the form of augmented content. For example, as the motor grader 190 moves in the forward direction with the blade 192 engaging the work surface 320, material can accumulate in front of and around the blade. In one aspect, the accumulated material may obscure visibility of the blade 192 which may be remedied by the display of the augmentation overlay depicting the present location of the work implement on the operator display device 198. However, in another aspect, the accumulated material in front of the blade 192 may resist the forward motion of the motor grader or a similar machine. The resistive force can be proportional to the quantity of material accumulated. To measure the resistive force and, indirectly, the accumulated material, one or more sensors 322 can be operatively associated with the propulsion devices, specifically, drive wheels 324, associated with the motor grader 190. As the resistance against forward motion from the accumulated material increases, the drive wheels 324 may begin to spin or slip with respect to the surface 320. Measuring the slippage value of the drive wheels 324, i.e., the amount or rate the wheels are spinning or slipping, enables an onboard controller or similar device to infer or estimate the amount of material the motor grader 190 is displacing. That information can be presented as augmentation content on the operator display device 198 as an estimate of the efficiency of the work being performed.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

I claim:

1. A machine comprising:
   a work implement having a working surface;
   an operator display device in which at least a portion of the work implement is visible; and
   a controller configured to generate an augmentation overlay indicating the working surface of the work implement and communicating the augmentation overlay for display on the operator display device.

2. The machine of claim 1, further comprising at least one feedback sensor for determining a position of the work implement, the at least one feedback sensor communicating with the controller.

3. The machine of claim 1, wherein the controller stores implement dimensional data regarding geometric proportions of the work implement and uses the implement dimensional data to generate the augmentation overlay.

4. The machine of claim 1, wherein the augmentation overlay is superimposed over a worksite visible in the operator display device.

5. The machine of claim 1, wherein the operator display device is selected from a group consisting of a head mounted display, a heads-up display and an off-board display.

6. The machine of claim 5, wherein the head mounted display and the heads-up display include a transparent display through which a worksite is visible.

7. A method of operating a work implement in a worksite, the method comprising:
   positioning a work implement in a position in which a working surface of the work implement is obstructed from view through an operator display device;
   generating an augmentation overlay indicating the working surface; and
   displaying on the operator display device the augmentation overlay superimposed on the worksite.

8. The method of claim 7, further comprising:
   determining the position of the work implement with at least one feedback sensor; and
   processing the position determined to generate the augmentation overlay.

9. The method of claim 8, further comprising:
   storing geometric information regarding geometric proportions of the work implement; and
   processing the geometric information to generate the augmentation overlay.

10. The method of claim 9, wherein the augmentation overlay includes an implement overlay superimposed over the work implement.

11. The method of claim 10, wherein the implement overlay is selected from the group consisting of a wireframe image, shading or a plurality of dots.

12. The method of claim 7, further comprising:
    repositioning the work implement in the worksite; and
    regenerating the augmentation overlay to reflect repositioning of the work implement.

13. The method of claim 7, wherein the operator display device is selected from a group consisting of a head mounted display, a heads-up display and an off-board display.

14. The method of claim 7, further comprising including worksite information in the augmented overlay.

15. The method of claim 14, wherein the worksite information is selected from the group consisting of a desired terrain of the worksite, a worksite material characteristic, and a target point disposed in the worksite.

16. The method of claim 7, further comprising measuring a slippage value of a propulsion device of a machine associated with the work implement; and inferring a quantity of material displaced by the work implement from the slippage value measured.

17. A controller-implemented method for assisting control of a work implement, the method comprising:
    storing implement dimensional data regarding geometric extensions of a work implement;
    receiving a plurality of data inputs including implement position data;
    generating an implement overlay from the implement dimensional data and the implement position data;
    displaying the implement overlay on an operator display device so as to be superimposed over the work implement.

18. The method of claim 17, wherein the plurality of data inputs are received from at least one feedback sensors operatively associated with the work implement.

19. The method of claim 17, wherein the implement overlay is selected from the group consisting of a wireframe image, shading or a plurality of dots.

20. The method of claim 17, wherein the operator display device is selected from a group consisting of a head mounted display, a heads-up display and an off-board display.

21. The machine of claim 1, wherein the working surface of the work implement is obstructed from view in the operator display device.

* * * * *